(12) United States Patent
King et al.

(10) Patent No.: US 12,657,312 B2
(45) Date of Patent: Jun. 16, 2026

(54) ARTIFICIAL INTELLIGENCE ("AI") SYSTEM FOR REAL-TIME MONITORING, ADJUSTMENT, AND SAFEGUARDING OF GENERATIVE AI OUTPUT

(71) Applicant: Bank of America Corporation, Charlotte, NC (US)

(72) Inventors: Adam Kristian King, Fort Mill, SC (US); Clara Fritts, Washington, DC (US); Brandon Wright, Charlotte, NC (US); Colleen C. Milazzo, Providence, RI (US); Lauren Maxwell, Washington, DC (US)

(73) Assignee: Bank of America Corporation, Charlotte, NC (US)

( * ) Notice: Subject to any disclaimer, the term of this patent is extended or adjusted under 35 U.S.C. 154(b) by 75 days.

(21) Appl. No.: 18/968,349

(22) Filed: Dec. 4, 2024

(65) Prior Publication Data

US 2026/0154415 A1    Jun. 4, 2026

(51) Int. Cl.
| | |
|---|---|
| *G06F 21/57* | (2013.01) |
| *G06N 3/042* | (2023.01) |
| *G06N 3/045* | (2023.01) |
| *G06N 3/098* | (2023.01) |

(52) U.S. Cl.
CPC .......... *G06F 21/577* (2013.01); *G06N 3/042* (2023.01); *G06N 3/045* (2023.01); *G06N 3/098* (2023.01); *G06F 2221/034* (2013.01)

(58) Field of Classification Search
CPC . G06F 21/577; G06F 2221/034; G06N 3/042; G06N 3/045; G06N 3/098
See application file for complete search history.

(56) References Cited

U.S. PATENT DOCUMENTS

| | | | |
|---|---|---|---|
| 10,853,468 B2 | 12/2020 | Taveau et al. | |
| 2018/0101847 A1 | 4/2018 | Pisut, IV | |
| 2019/0029760 A1 | 1/2019 | Nahman et al. | |
| 2025/0068741 A1* | 2/2025 | Lafon | G06F 16/3344 |
| 2025/0322216 A1* | 10/2025 | Levin | G06N 3/045 |
| 2026/0025436 A1* | 1/2026 | Murphy | G06F 9/5072 |

* cited by examiner

*Primary Examiner* — J. Brant Murphy
*Assistant Examiner* — Christopher Lam
(74) *Attorney, Agent, or Firm* — Weiss & Arons LLP

(57) ABSTRACT

Systems and methods for real-time monitoring, adjustment, and safeguarding of generative artificial intelligence ("AI") output. The systems and methods may include a security risk assessment algorithm rules engine ("rules engine"). The rules engine may include logic-based, language-encoded, rules for weighting queries involving security risks and for flagging security risks comprising queries and outputs ("rules"). The systems and methods may include an internal compliance database. The internal compliance database may include flagged queries, flagged outputs, and the rules. The systems and methods may include an adaptive feedback loop mechanism. The systems and methods may include a generative, pre-trained, transformer ("GPT") processor. The GPT processor may receive a plurality of queries from a plurality of users. The GPT processor may forward the plurality of queries to the rules engine for evaluation. The evaluation may compare the plurality of queries to the flagged queries in the internal compliance database.

20 Claims, 7 Drawing Sheets

300

302

GENERATIVE
AI MODEL

304

REALTIME
OUTPUT
MONITORING

306

SECURITY RISK
ASSESSMENT
ALGORITHMS

308

ADAPTIVE
SAFEGUARDING
MECHANISMS

310

CONTINUOUS
LEARNING
LOOP

ARTIFICIAL INTELLIGENCE ("AI") SYSTEM FOR REAL-TIME MONITORING, ADJUSTMENT, AND SAFEGUARDING OF GENERATIVE AI OUTPUT

FIELD OF TECHNOLOGY

Aspects of the disclosure relate to artificial intelligence ("AI") systems and methods. Aspects of the disclosure relate specifically to AI systems and methods for real-time monitoring, adjustment, and safeguarding of generative AI ("GenAI") output.

BACKGROUND OF THE DISCLOSURE

As GenAI becomes increasingly prevalent across various industries, its ability to produce novel solutions, content, and ideas introduces significant risks. GenAI output, while innovative, can sometimes be harmful, unauthorized, or inappropriate. Further, GenAI systems could provide false information and mistakes.

These outputs may result in ethical dilemmas, legal challenges, or safety concerns. Current GenAI models lack a robust mechanism to detect and mitigate such risks in real time before these outputs reach end users.

Therefore, there is a pressing need for an AI system that can monitor, adjust, and safeguard the outputs of GenAI, ensuring that only safe and authorized content is delivered. And there is a need to provide these GenAI systems in real time for output compliance purposes.

Previous systems and methods for monitoring AI systems have been disclosed. US20180101847A1 describes systems and methods for monitoring artificial intelligence systems to ensure they operate within defined parameters. It includes mechanisms for detecting deviations from expected behavior and generating alerts when anomalies are detected. The system focuses on ensuring that AI behaves as intended by comparing AI output against predefined rules or thresholds.

There remains a need for an AI system that not only monitors, but also actively intervenes in real time to adjust or block AI outputs that are deemed harmful or unauthorized. Additionally, there is a need to include an adaptive learning loop, which may allow a system to continuously evolve and refine its rules based on new data and outputs.

US20190029760A1 discloses an AI system for evaluating and monitoring the output of AI systems. US20190029760A1 discloses evaluating and monitoring the output of AI systems to ensure compliance with regulatory requirements and ethical standards. It focuses on evaluating the content generated by AI systems against predefined ethical or regulatory standards and generating reports or taking corrective action if non-compliance is detected.

While this disclosure focuses on evaluating and reporting, there remains a need for an additional layer of real-time adaptive intervention, where the system can modify or block outputs before reaching the end user. Furthermore, there is a need for a continuous learning loop allowing a system to adapt to new threats or risks, enhancing its ability to safeguard AI outputs in a dynamic environment.

U.S. Pat. No. 10,853,468B2 discloses a system and method for detecting and preventing unintended AI behavior. U.S. Pat. No. 10,853,468B2 discloses detecting and preventing unintended AI behavior by analyzing AI outputs and comparing them against a set of expected behaviors. If deviations are found, the system intervenes to prevent potential harm or incorrect behavior. It primarily addresses unintended actions by AI that could lead to errors or malfunctions.

There remains a need to not only detect unintended behavior, but also to address ethical, legal, and safety risks specifically associated with generative AI outputs. Real-time content modification and a system's ability to continuously learn from previous outputs to improve future interventions would therefore be desired. This real-time adaptability and learning would make a system more robust and capable of handling complex, evolving threats in a way that differs from the static approach of detecting unintended actions.

While other technology providers exist, none offer products that are comprehensive enough to meet the needs of entities addressing regulatory and compliance needs, cybersecurity, scale, resilience, and level of service needed to support large multi-national enterprises. It would therefore be desirable to provide AI systems and methods to address these needs. Further, it would be desirable to provide systems and methods of real-time monitoring, adjustment, and safeguarding of GenAI output.

SUMMARY OF THE DISCLOSURE

Provided herein are systems and methods for AI safeguarding. The systems and methods may provide real-time output monitoring. The systems and methods may use natural language processing ("NLP") and computer vision models for content analysis.

The systems and methods may provide an AI dynamic rule-based system for safeguarding output with respect to decisioning which queries qualify for an adaptive feedback loop. The decisioning may be operable with federated learning and auto-machine learning ("auto-ML").

The systems and methods may include a security risk assessment algorithm rules engine ("rules engine"). The rules engine may include logic-based, language-encoded, rules ("rules") for weighting queries involving security risks. The rules engine may include rules for flagging security risks. The security risks may include, e.g., queries and outputs.

The systems and methods may include an internal compliance database. The internal compliance database may include, e.g., flagged queries, flagged outputs, and rules.

The systems and methods may include an adaptive feedback loop mechanism. The systems may include a generative, pre-trained, transformer ("GPT") processor.

The systems and methods may be operable to receive, by the GPT processor, a plurality of queries from a plurality of users. The systems and methods may be operable to forward, by the GPT processor, the plurality of queries to the rules engine for evaluation. The rules engine may interface with the internal compliance database. The evaluation may compare the plurality of queries to the flagged queries in the internal compliance database. The evaluation may analyze the plurality of queries based on the rules.

The systems and methods may be operable to determine, by the GPT processor interfacing with the rules engine and the internal compliance database, a security risk level for each query in the plurality of queries. The systems and methods may be operable to generate, by the GPT processor, output for the plurality of queries. The plurality of queries may have security risk levels above a first predetermined threshold.

The systems and methods may be operable to deny, by the GPT processor, generating output for a plurality of queries with security risk levels below a second predetermined threshold. The systems and methods may be operable to send, by the rules engine, a plurality of queries with security risk levels lower than the first predetermined threshold and higher than the second predetermined threshold to the adaptive feedback loop mechanism.

For each query sent to the adaptive feedback loop mechanism, the adaptive feedback loop mechanism may be operable to generate, by the GPT processor, output corresponding to a plurality of queries with security risk levels lower than the first predetermined threshold and higher than the second predetermined threshold (herein defined as "mid-output").

The systems and methods may be operable to secure the mid-output by analyzing the mid-output by the rules. The systems and methods may be operable to secure the mid-output by comparing the mid-output to the flagged outputs. The systems and methods may be operable to secure the mid-output by modifying the mid-output based on the analyzing and the comparing.

The systems and methods may be operable to secure the mid-output by refining the rules, using federated learning and auto-ML, based on the analyzing, the comparing, and the modifying.

The systems and methods may be operable to identify one or more rules, included in the rules engine, that caused the security risk level to be below the first predetermined threshold. The systems and methods may be operable to adjust a weighting of the identified one or more rules at the rules engine.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout.

DETAILED DESCRIPTION OF THE DISCLOSURE

Figure 1:
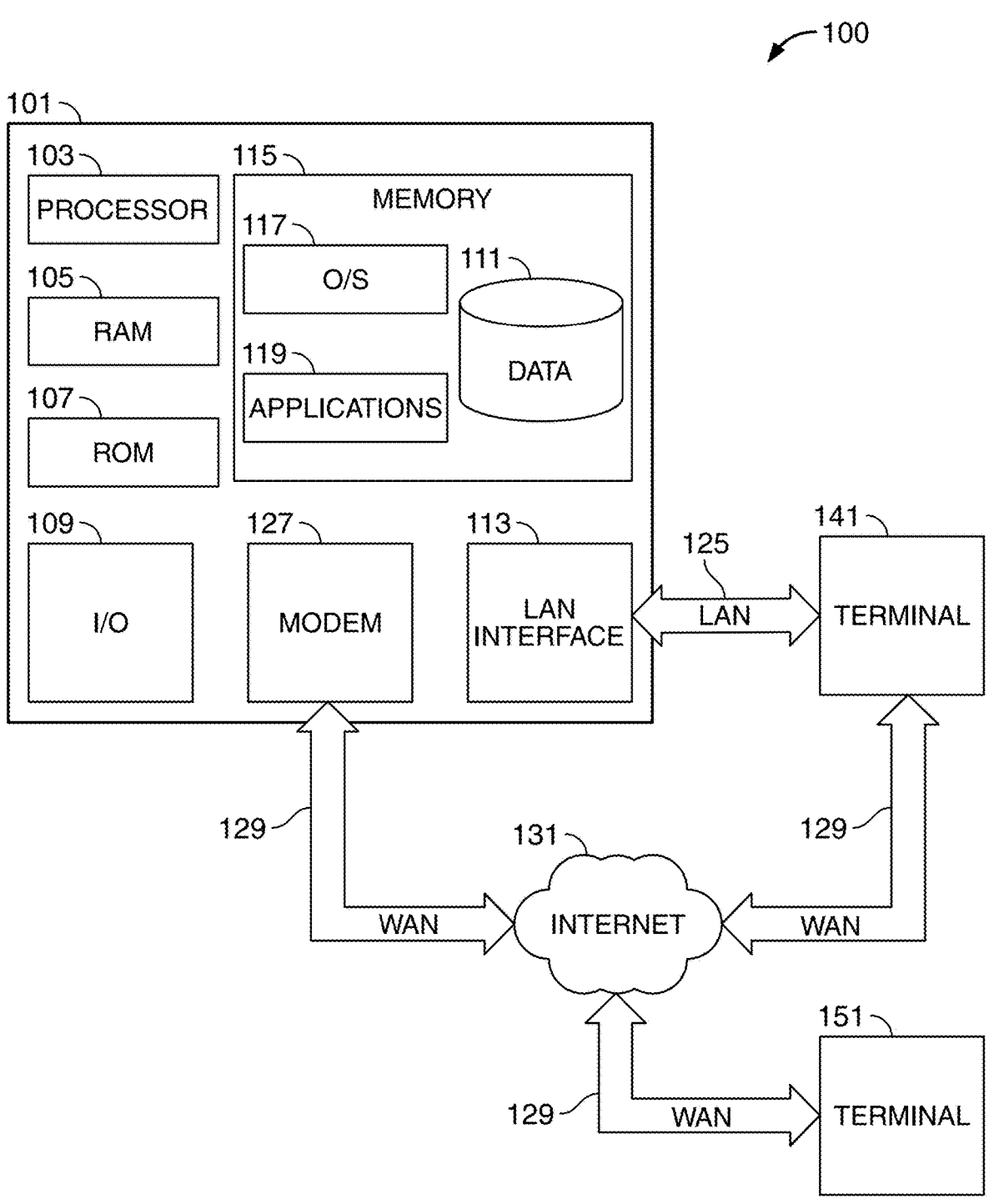
FIG. 1 shows a schematic diagram 100 in accordance with principles of the disclosure.

Systems and methods are provided for safeguarding output with respect to decisioning which queries qualify for an adaptive feedback loop. The decisioning may be operable with federated learning. The decisioning may be operable with auto-ML. The systems and methods may include an AI dynamic rule-based system.

The systems and methods may provide improved dynamic contextual awareness of queries and outputs in real time. The systems and methods may check outputs, provide security risk assessments, and modify final GenAI outputs.

The systems and methods may use edge computing for scalability of security risk assessments. The systems and methods may use distributive processing for scalability of security risk assessments. Each security risk assessment algorithm may be modularized. Each security risk assessment algorithm may be made into a microservice to ease scalability.

The systems and methods may include an adaptive feedback loop mechanism. The adaptive feedback loop mechanism may provide real-time adaptations to mid-output. A continuous learning loop mechanism may provide long term changes to the algorithms, rules, and mid-outputs.

The systems and methods may leverage added intelligence from user interactions to adapt the monitoring, detection, and safeguarding. The systems and methods may prevent, e.g., insider trading by detecting insider trading patterns in users based on pre-trained queries and rules.

The systems may provide an AI dynamic rule-based system for safeguarding output with respect to decisioning which queries qualify for an adaptive feedback loop. The decisioning may be operable with federated learning and auto-ML.

The systems may include a security risk assessment algorithm rules engine ("rules engine"). The rules engine may include logic-based, language-encoded, rules ("rules") for weighting queries involving security risks. The rules engine may include rules for flagging security risks. The security risks may include, e.g., queries and outputs.

The systems may include an internal compliance database. The internal compliance database may include, e.g., flagged queries, flagged outputs, and the rules.

The systems may include an adaptive feedback loop mechanism. The systems may include a GPT processor.

The GPT processor may be operable to receive, by the GPT processor, a plurality of queries from a plurality of users. The GPT processor may be operable to forward, by the GPT processor, the plurality of queries to the rules engine for evaluation. The rules engine may interface with the internal compliance database. The evaluation may compare the plurality of queries to the flagged queries in the internal compliance database. The evaluation may analyze the plurality of queries based on the rules.

The GPT processor may be operable to determine, by the GPT processor interfacing with the rules engine and the internal compliance database, a security risk level for each query in the plurality of queries. The GPT processor may be operable to generate, by the GPT processor, output for the plurality of queries with security risk levels above a first predetermined threshold.

The GPT processor may be operable to deny, by the GPT processor, generating output for a plurality of queries with security risk levels below a second predetermined threshold. The GPT processor may be operable to send, by the rules engine, a plurality of queries with security risk levels lower than the first predetermined threshold and higher than the second predetermined threshold to the adaptive feedback loop mechanism.

For each query sent to the adaptive feedback loop mechanism, the adaptive feedback loop mechanism may be operable to generate, by the GPT processor, output corresponding to a plurality of queries with security risk levels lower than the first predetermined threshold and higher than the second predetermined threshold ("mid-output").

The GPT processor may be operable to secure the mid-output by analyzing the mid-output by the rules. The GPT processor may be operable to secure the mid-output by comparing the mid-output to the flagged outputs. The GPT processor may be operable to secure the mid-output by modifying the mid-output based on the analyzing and the comparing.

The GPT processor may be operable to secure the mid-output by refining the rules, using federated learning and auto-ML, based on the analyzing, the comparing, and the modifying.

The GPT processor may be operable to identify one or more rules, included in the rules engine, that caused the security risk level to be below the first predetermined threshold. The GPT processor may be operable to adjust a weighting of the identified one or more rules at the rules engine.

The GPT processor may be operable to lower a weighting of the identified one or more rules at the rules engine. The GPT processor may be operable to raise a weighting of the identified one or more rules at the rules engine.

The GPT processor may be operable to check the mid-output before it reaches a user. The GPT processor may be operable to modify the mid-output before it reaches a user. The GPT processor may be operable to provide mid-output to a plurality of users with approximately no lag time.

The plurality of queries may include, e.g., hate speech, false information, and inappropriate language. The refining of the rules may include reinforcement learning ("RL"), based on the analyzing, the comparing, and the modifying.

The refining of the rules may include neural networks, based on the analyzing, the comparing, and the modifying. The refining of the rules may include edge computing for scalability of the rules engine. The refining of the rules may include distributive processing for scalability of the rules engine.

The methods may provide AI dynamic rule-based method for safeguarding output with respect to decisioning which queries qualify for an adaptive feedback loop. The decisioning may be operable with federated learning. The decisioning may be operable with auto-ML.

The methods may include forwarding, by the GPT processor, the plurality of queries to a security risk assessment algorithm rules engine ("rules engine") for evaluation. The methods may include interfacing the rules engine with an internal compliance database.

The methods may include comparing the plurality of queries to flagged queries in the internal compliance database. The methods may include analyzing the plurality of queries based on logic-based, language-encoded, rules ("rules") for weighting queries involving security risks. Queries involving security risks may include queries with, e.g., inappropriate content, tone, and/or implications. The methods may include analyzing the plurality of queries based on rules for flagging security risks. The security risks may include, e.g., queries and outputs.

The methods may include receiving, by a GPT processor, a plurality of queries from a plurality of users. The methods may include determining, by the GPT processor interfacing with the rules engine and the internal compliance database, a security risk level for each query in the plurality of queries.

The methods may include generating, by the GPT processor, output for the plurality of queries with security risk levels above a first predetermined threshold. The methods may include denying, by the GPT processor, generating output for a plurality of queries with security risk levels below a second predetermined threshold.

The methods may include sending, by the rules engine, a plurality of queries with security risk levels lower than the first predetermined threshold and higher than the second predetermined threshold to the adaptive feedback loop mechanism. The methods may include for each query sent to an adaptive feedback loop mechanism, using the adaptive feedback loop mechanism by generating, by the GPT processor, output corresponding to a plurality of queries with security risk levels lower than the first predetermined threshold and higher than the second predetermined threshold ("mid-output").

The methods may include securing the mid-output by analyzing the mid-output by the rules ("the analyzing"). The methods may include securing the mid-output by comparing the mid-output to the flagged outputs ("the comparing"). The methods may include modifying the mid-output based on the analyzing and the comparing ("the modifying").

The methods may include refining the rules, using federated learning and auto-ML, based on the analyzing, the comparing, and the modifying. The methods may include identifying one or more rules, included in the rules engine, that caused the security risk level to be below the first predetermined threshold. The methods may include adjusting a weighting of the identified one or more rules at the rules engine.

The methods may include lowering a weighting of the identified one or more rules at the rules engine. The methods may include raising a weighting of the identified one or more rules at the rules engine.

The methods may include checking the mid-output. The methods may include modifying the mid-output before the mid-output reaches a user. The methods may include providing mid-output and/or output to the plurality of users with approximately no lag time.

The methods may include analyzing a plurality of queries. The plurality of queries may include, e.g., hate speech, false information, and inappropriate language.

The methods may include refining of the rules using RL based on the analyzing, the comparing, and the modifying. The methods may include refining of the rules using neural networks, based on the analyzing, the comparing, and the modifying.

The methods may include refining of the rules using edge computing for increasing scalability of the rules engine. The methods may include refining of the rules using distributive processing for enhancing scalability of the rules engine.

Edge computing and/or distributive processing may be used to enhance and/or increase scalability. The increased/enhanced scalability may be achieved by increasing an aspect of the rules using edge computing. The increased/enhanced scalability may also be achieved by increasing processing power in the system by distributive processing.

The systems and methods may continuously monitor text, images, audio, and/or other media generated by AI, evaluating them against a comprehensive set of rules and ethical guidelines. The systems and methods may use NLP engines (e.g., bidirectional encoder representations from transformers ("BERT") or GPT variants) to analyze textual outputs in real time, scanning for, e.g., harmful language, biased content, and/or unauthorized information.

The systems and methods may use computer vision models (e.g., You Only Look Once ("YOLO") and/or Visual Geometry Group ("VGG")) to analyze visual content, detecting inappropriate and/or unauthorized imagery. The systems and methods may use audio processing modules (using models like Wav2Vec) to analyze spoken and/or musical outputs, ensuring compliance with legal and ethical standards.

The systems and methods may use hybrid rule-based and machine learning ("ML")-based systems and algorithms. These systems and algorithms may assess the potential security risks of AI outputs by comparing them to a database of known risks, ethical guidelines, and legal frameworks.

The systems and methods may include rule-based systems. The rule-based systems may include predefined rules covering common risks, such as hate speech, misinformation, and/or intellectual property violations. These rules may be encoded using logic-based languages like Prolog.

The systems and methods may include ML models. The ML models may be supervised and/or unsupervised learning models trained on datasets of known harmful outputs, enabling the system to identify new and/or evolving risks. The systems and methods may include techniques like anomaly detection and sentiment analysis to assist in recognizing subtle issues.

The systems and methods may include security risk level scoring. Each output may be assigned a security risk level, which may determine the level of intervention required. A security risk level of 100 may be a maximum-security risk level. A security risk level of 0 may be a minimum-security risk level.

The systems and methods may include adaptive safeguarding mechanisms. The systems and methods may include reinforcement learning ("RL"). The systems and methods may include neural networks.

The systems and methods may adapt output responses to detected security risks, dynamically adjusting or blocking outputs. The systems and methods may use reinforcement learning to improve decision-making over time.

The systems and methods may include content adjustment. The systems and methods may rewrite and/or reformat content to mitigate security risks. For example, a textual output containing sensitive information may be redacted and/or rephrased.

The systems and methods may include output blocking. High-risk output, e.g., output with a security risk level greater than a predetermined threshold, may be blocked from being delivered to an end user. The systems and methods may generate an alert. The systems and methods may generate a log event for review.

The systems and methods may include user feedback integration. The systems and methods may incorporate feedback from users and experts to refine system security risk assessment and safeguarding mechanisms, using techniques like active learning.

The systems and methods may include a feedback loop for model improvement. Data from adjusted or blocked outputs may be fed back into the generative AI model to improve its ability to produce safe and authorized content.

The systems and methods may include federated learning. The systems and methods may allow decentralized learning from multiple sources without compromising data privacy, ensuring the AI model evolves based on diverse inputs.

The systems and methods may use auto-ML to automatically adjust the parameters of the GenAI model. The system and methods may optimize the GenAI model for compliance with safety and ethical standards.

The systems and methods may include managing and mitigating risks associated with generative AI outputs. The systems and methods may not rely on post-hoc review and/or user feedback. The systems and methods may operate in real-time, proactively safeguarding against potential harm before they reach the end user.

The systems and methods may integrate adaptive safeguarding mechanisms, which may adjust and/or block content based on real-time security risk assessments. The systems and methods may include a continuous feedback loop for model improvement.

The systems and methods may include multi-layered architecture, combining real-time monitoring, security risk assessment, adaptive content modification, and feedback loop for continuous learning. The systems and methods may use emerging technologies like federated learning and auto-ML for real-time improvement of GenAI models, ensuring that the AI not only avoids generating harmful content but also learns to produce safer outputs over time. The systems and methods may provide a scalable, flexible solution to the growing challenges of AI safety.

The systems and methods may create GenAI data. GenAI outputs may then be monitored and evaluated for potential security risks, including, e.g., ethical, legal, safety, and policy concerns.

The monitored outputs may be processed by security risk assessment algorithms that may assign security risk levels based on predefined rules and ML models. This analysis may determine the necessary actions to mitigate any identified security risks.

Depending on the security risk assessment, the system may adjust, block, or modify the AI outputs to ensure they are authorized before reaching the end user. The results may be fed back into the system's learning loops as feedback to help refine the AI model. This may improve the system's ability to generate safe data repeatably.

The systems and methods may enable real-time monitoring and safeguards for compliance. The systems and methods may provide an enterprise AI system. The systems and methods may check output generated by GenAI before the output reaches a user.

The systems and methods may utilize, e.g., NLP and computer vision to block outputs, if necessary. The systems and methods may employ, e.g., text, image, and audio methods to generate, block, and modify outputs.

The systems and methods may integrate audio-visual processing modes to flag and safeguard inappropriate language, imagery, and sensitive information in output to users. The systems and methods may employ synaptic, semantic, and syntactic methods that integrate query sentence structure analyses to secure, e.g., hate speech, false information, and inappropriate language.

The systems and methods may include a spectrogram analysis to break down audio data into, e.g., tone, frequency, and pitch. The systems and methods may secure malicious and/or stress-inducing tones, frequency, pitches, and outputs.

The systems and methods may include a GenAI output pipeline. The GenAI output pipeline may be assessed and secured in real time based on an internal compliance database. The systems and methods may ensure that users do not experience a lag in output responses.

Systems and methods described herein are illustrative. Systems and methods in accordance with this disclosure will now be described in connection with the figures, which form a part hereof. The figures show illustrative features of system and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a LAN 125 and a wide area network ("WAN") 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS"), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
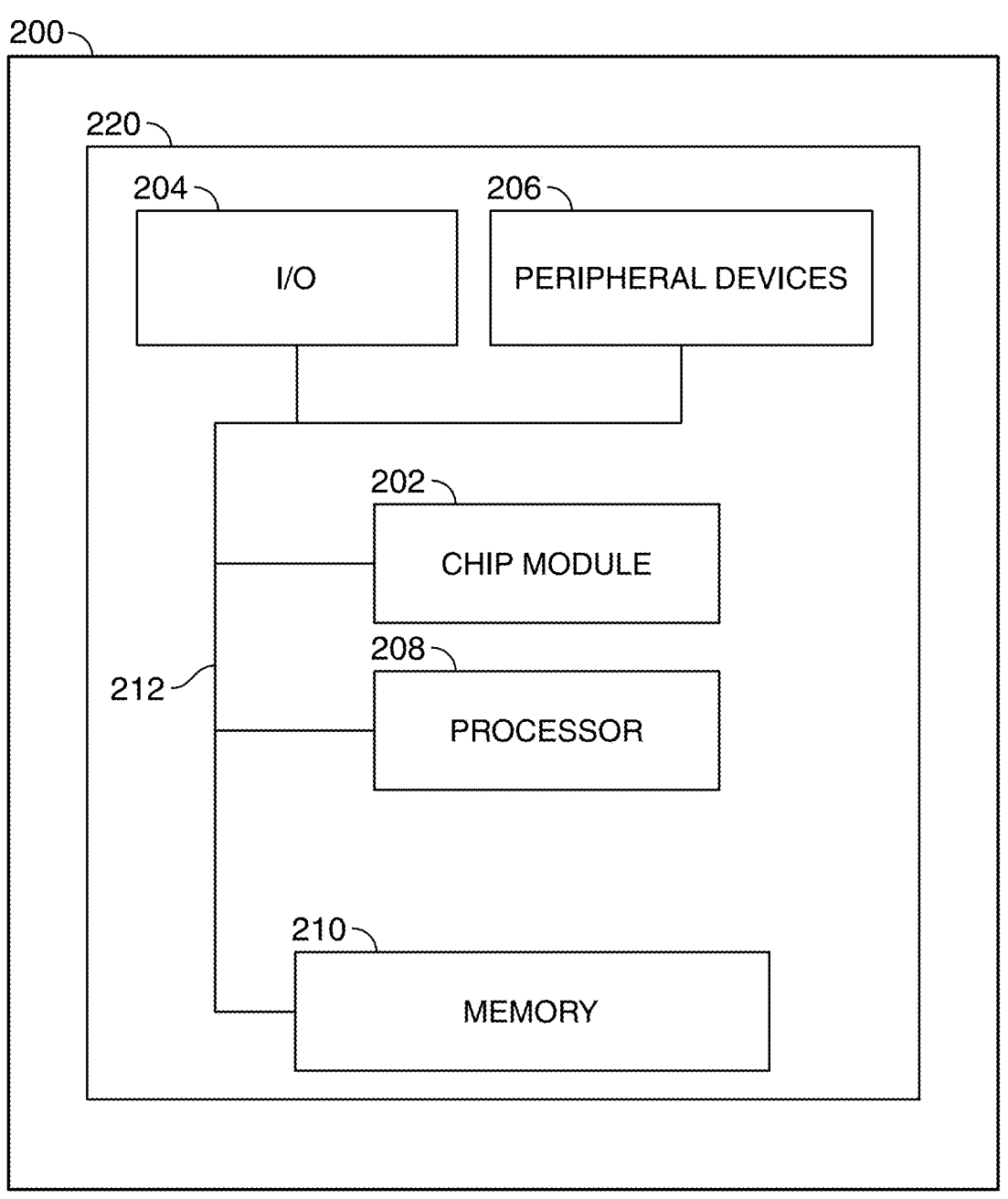
FIG. 2 shows another schematic diagram 200 in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
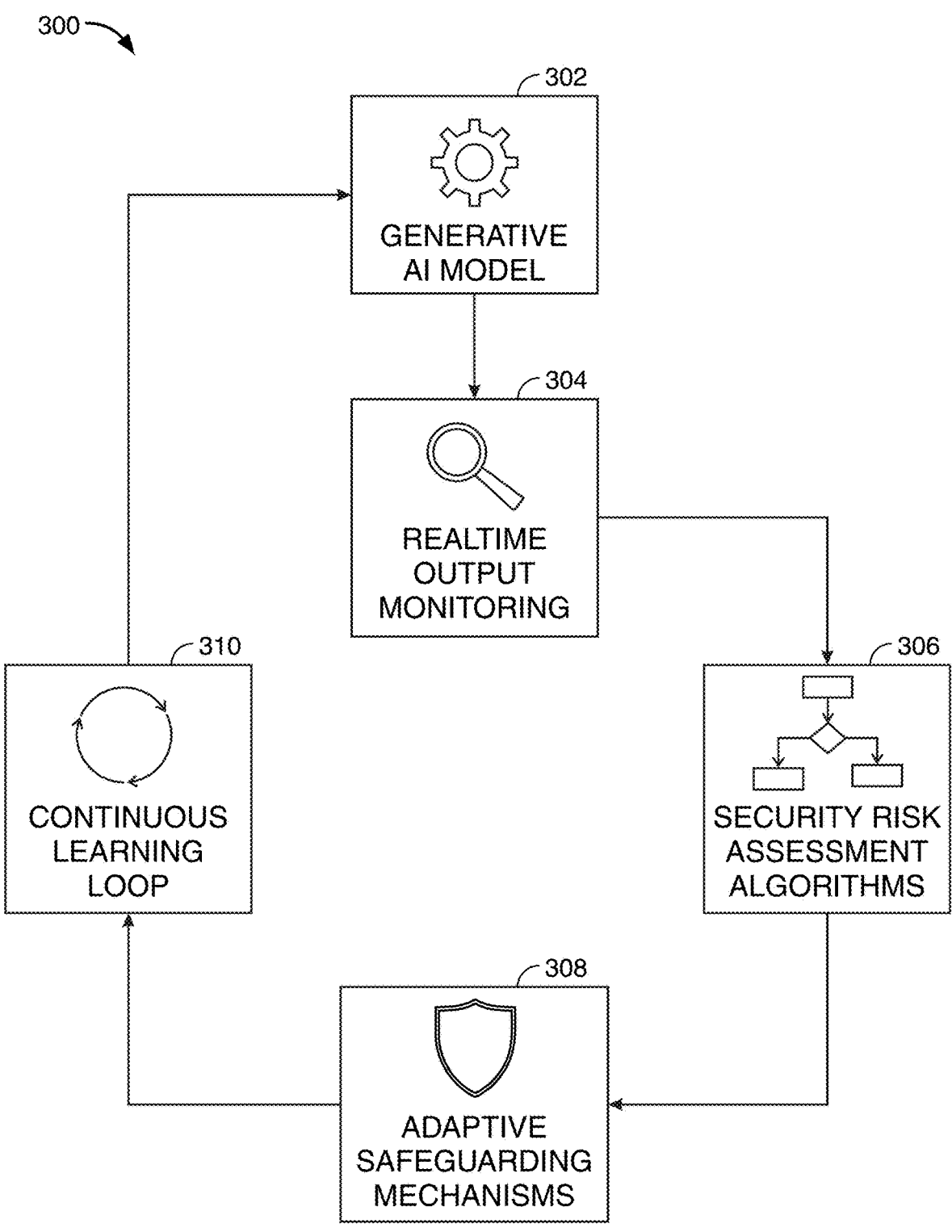
FIG. 3 shows an illustrative process flow 300 for a system in accordance with principles of the disclosure.

FIG. 3 shows an illustrative process flow 300 for a system in accordance with principles of the disclosure.

Illustrative process flow 300 may include a generative AI model 302. The generative AI model 302 may analyze queries and produce mid-outputs and outputs. The generative AI model 302 may forward queries, mid-outputs, and outputs to real time output monitoring 304. The real time output monitoring 304 may monitor and secure queries, mid-output, and output in real time.

The real time output monitoring 304 may forward the queries, mid-outputs, and outputs to security risk assessment algorithms 306. The security risk assessment algorithms 306 may analyze the queries, mid-outputs, and outputs based on an internal compliance database and compliance rules.

The security risk assessment algorithms 306 may forward the queries, mid-outputs, and outputs to adaptive safeguarding mechanisms 308. The adaptive safeguarding mechanisms 308 may provide real time adaptive safeguarding mechanisms to secure the queries, mid-outputs, and outputs.

The adaptive safeguarding mechanisms 308 may forward the queries, mid-outputs, and outputs to continuous learning loop 310. Continuous learning loop 310 may provide long-term learning to update the internal compliance database and the rules. Continuous learning loop 310 may forward the adapted queries, mid-output, and output to the generative AI model 302.

Figure 4:
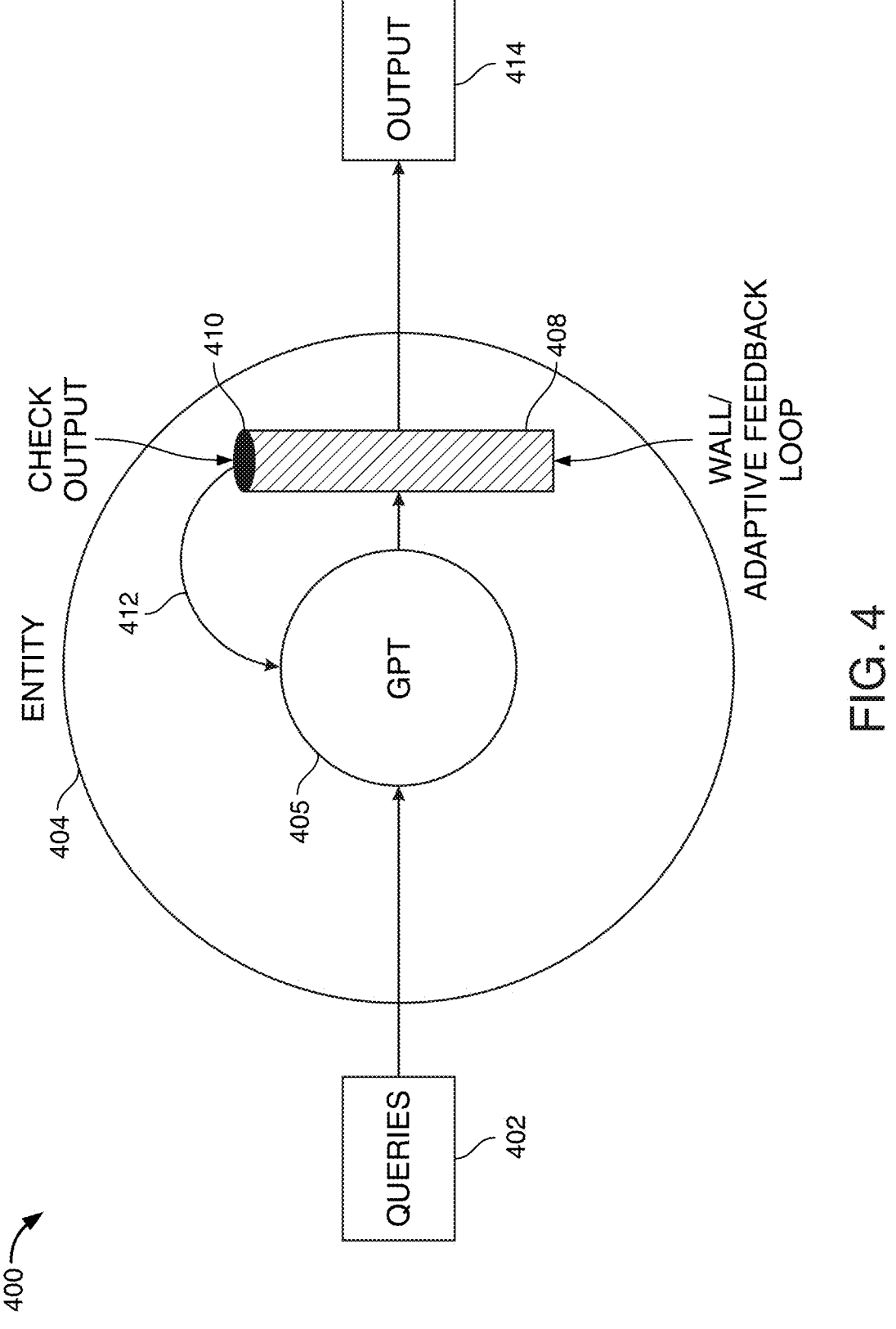
FIG. 4 shows an illustrative process flow 400 for a system in accordance with principles of the disclosure.

FIG. 4 shows an illustrative process flow 400 for a system in accordance with principles of the disclosure.

The illustrative process flow 400 may include sending, e.g., queries 402 to GPT 405 located within entity 404.

The illustrative process flow 400 may include checking output and mid-output 410 at a wall/adaptive feedback loop 408. The wall component within wall/adaptive feedback loop 408 may block outputs from reaching end users. The adaptive feedback loop component within wall/adaptive feedback loop 408 may modify queries, mid-output, and/or output.

Queries, mid-output, and output may be sent back 412 to GPT 405 for additional modifications. Output 414 may be sent to users after being checked and, if necessary, modified by GPT 405.

Figure 5:
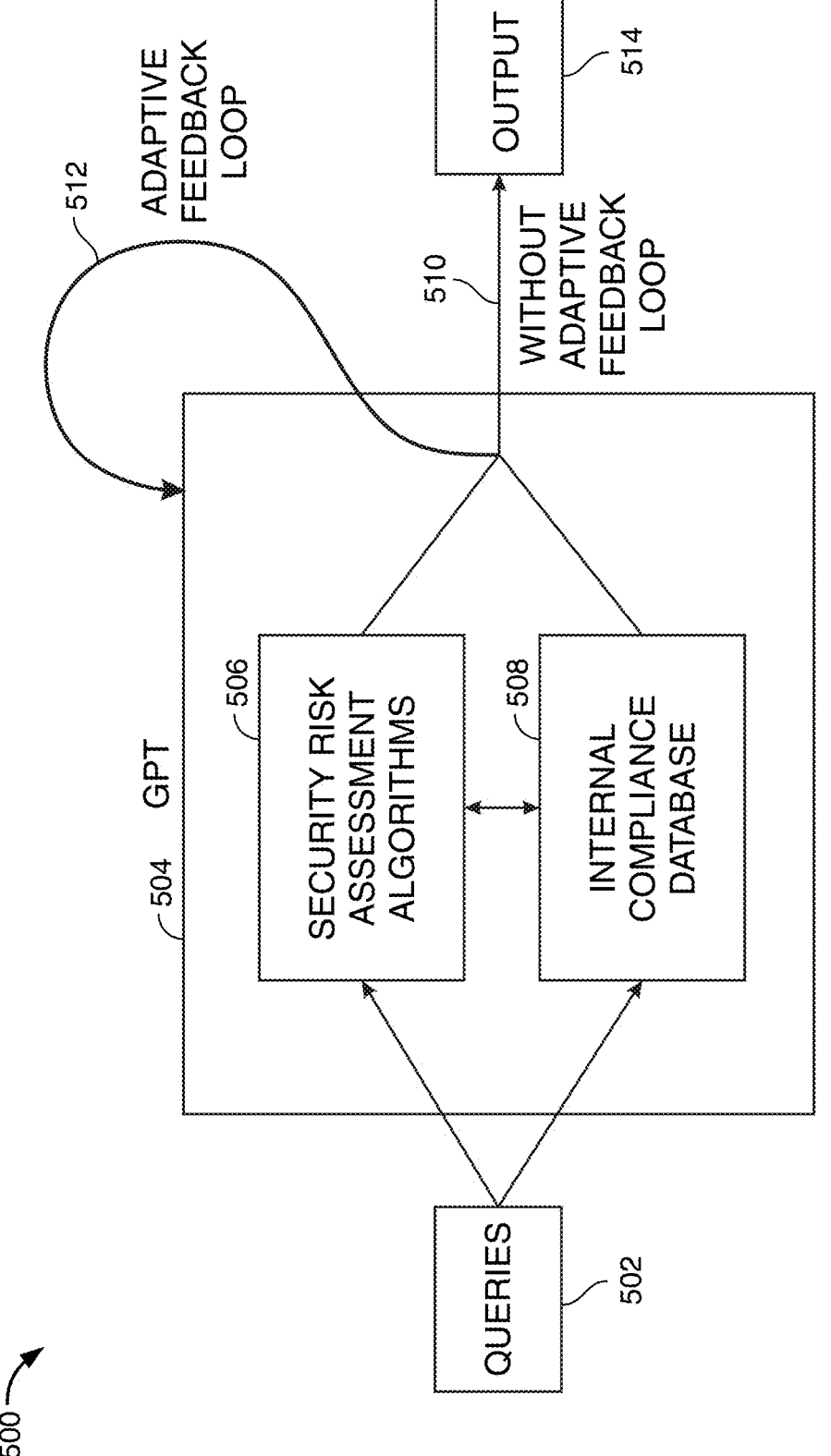
FIG. 5 shows an illustrative process flow 500 for a system in accordance with principles of the disclosure.

FIG. 5 shows an illustrative process flow 500 for a system in accordance with principles of the disclosure.

Illustrative process flow 500 may include sending queries 502 to GPT 504. GPT 504 may include security risk assessment algorithms 506 and internal compliance database 508.

The queries 502 may be sent to security risk assessment algorithms 506 and internal compliance database 508 located within GPT 504 for analysis. If harmless, output 514 may be sent to an end user without an adaptive feedback loop 510.

If deemed harmful or inappropriate, however, mid-output generated by GPT 504 may be sent to an adaptive feedback loop 512 for additional modification.

Figure 6:
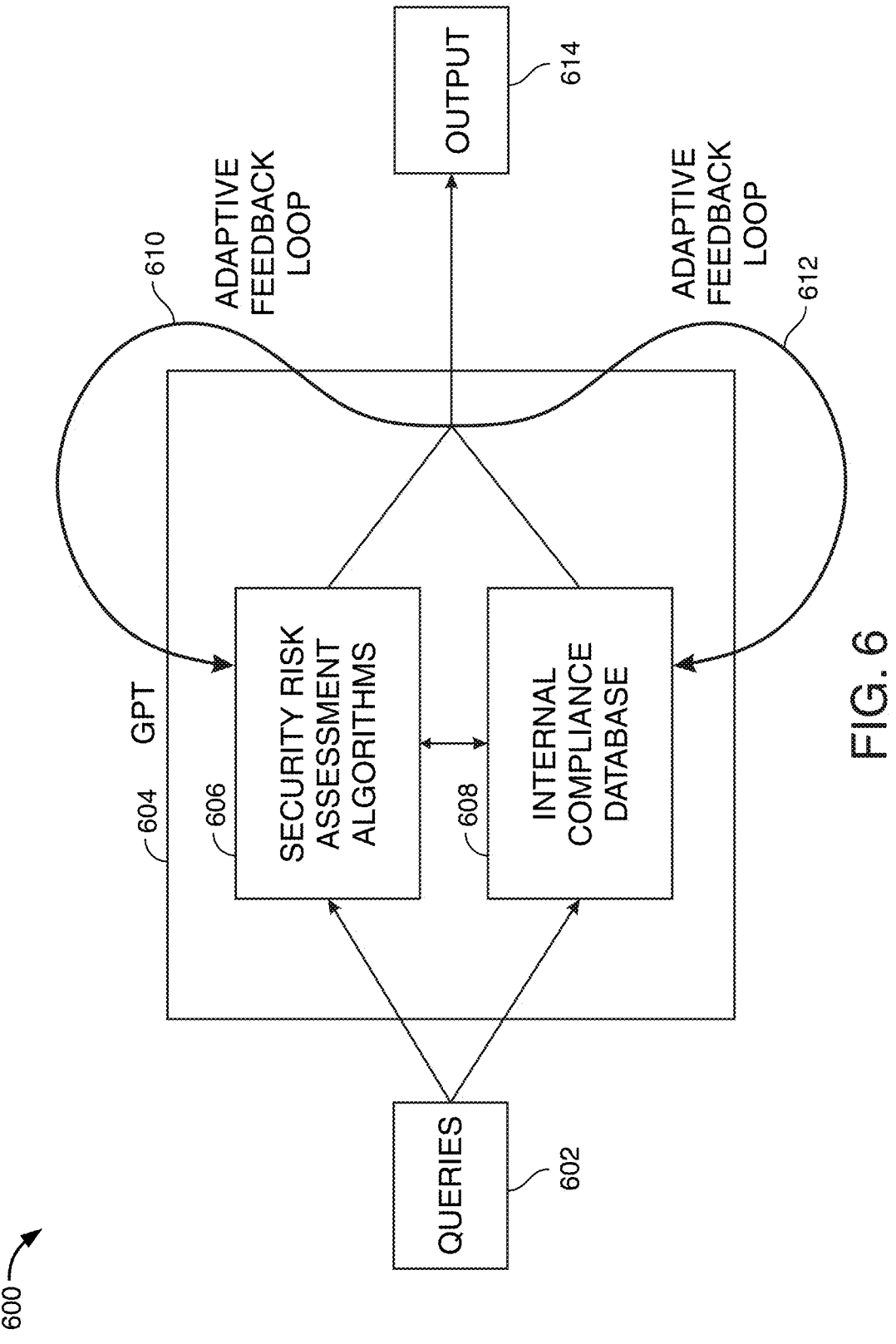
FIG. 6 shows an illustrative process flow 600 for a system in accordance with principles of the disclosure.

FIG. 6 shows an illustrative process flow 600 for a system in accordance with principles of the disclosure.

Illustrative process flow 600 may include sending queries 602 to GPT 604. GPT 604 may include security risk assessment algorithms 606 and internal compliance database 608.

The queries 602 may be sent directly to security risk assessment algorithms 606 and internal compliance database 608 located within GPT 604 for analysis.

If deemed harmful and/or inappropriate, mid-output generated by GPT 604 may be sent to an adaptive feedback loop 610 for additional modification. Adaptive feedback loop 610 may send the mid-output to security risk assessment algorithms 606 for analysis and modification.

If deemed harmful and/or inappropriate, mid-output generated by GPT 604 may be sent to an adaptive feedback loop 612 for additional modification. Adaptive feedback loop 612 may send the mid-output to internal compliance database 608 for analysis and modification.

Figure 7:
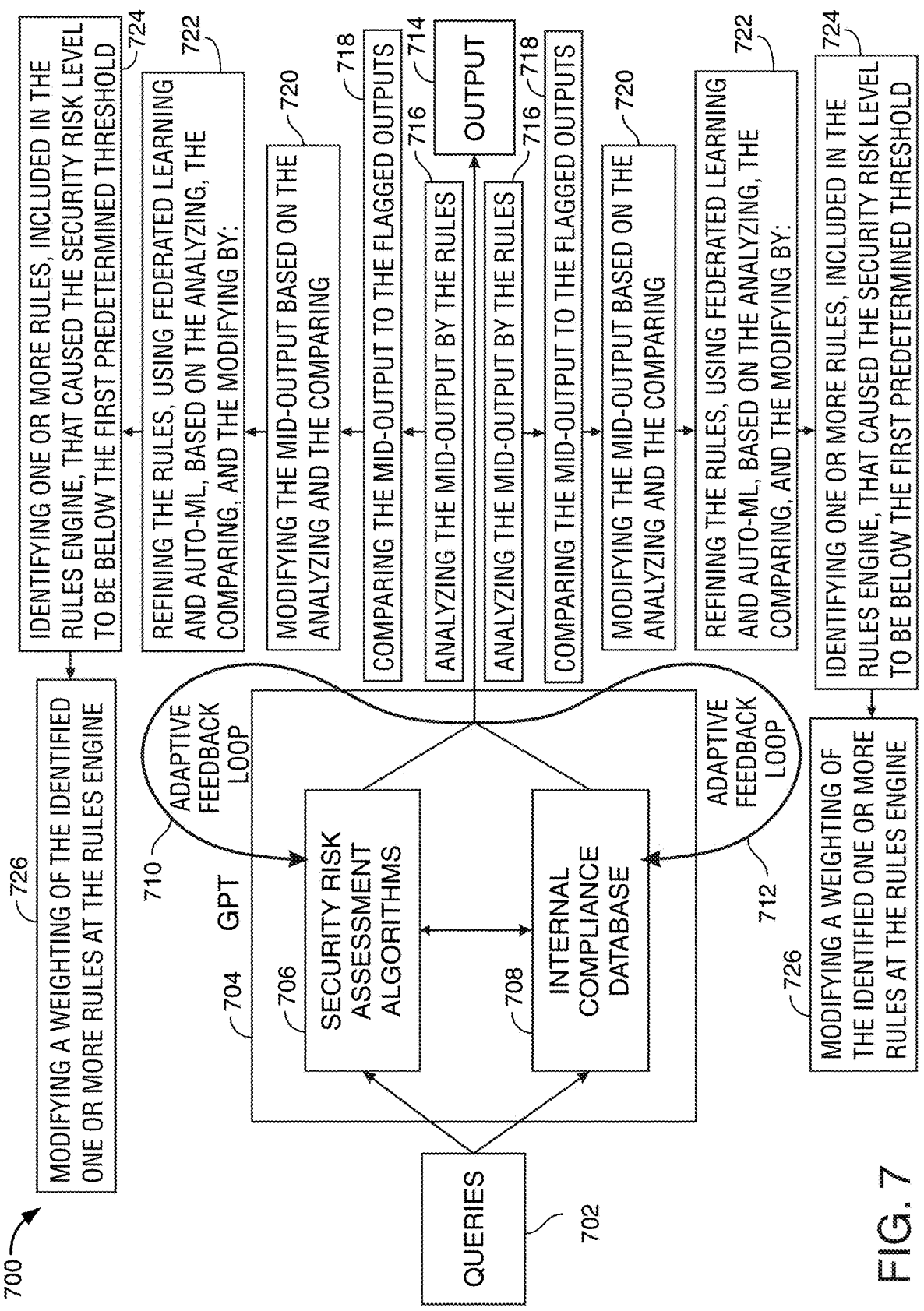
FIG. 7 shows an illustrative process flow 700 for a system in accordance with principles of the disclosure.

FIG. 7 shows an illustrative process flow 700 for a system in accordance with principles of the disclosure.

Illustrative process flow 700 may include sending queries 702 to GPT 704. GPT 704 may include security risk assessment algorithms 706 and internal compliance database 708.

The queries 702 may be sent directly to security risk assessment algorithms 706 and internal compliance database 708 located within GPT 704 for analysis.

If deemed harmful and/or inappropriate, mid-output generated by GPT 704 may be sent to an adaptive feedback loop 710 for additional modification. Adaptive feedback loop 710 may send the mid-output to security risk assessment algorithms 706 for analysis and modification.

If deemed harmful and/or inappropriate, mid-output generated by GPT 704 may be sent to an adaptive feedback loop 712 for additional modification. Adaptive feedback loop 712 may send the mid-output to internal compliance database 708 for analysis and modification.

Illustrative process flow 700 may include steps for adaptive feedback loop 710 and adaptive feedback loop 712 mechanisms. Adaptive feedback loop 710 and adaptive feedback loop 712 may have the same steps (as below steps 716, 718, 720, 722, 724, and 726) or different steps.

Step 716 may include analyzing the mid-output by the rules. Step 718 may include comparing the mid-output to the flagged outputs.

Step 720 may include modifying the mid-output based on the analyzing and the comparing. Step 722 may include refining the rules, using federated learning and auto-ML, based on the analyzing, the comparing, and the modifying by steps 724 and 726.

Step 724 may include identifying one or more rules, included in the rules engine, that caused the security risk level to be below the first predetermined threshold. And step 726 may include modifying a weighting of the identified one or more rules at the rules engine.

The disclosure may be operational with numerous other general purpose or special purpose computing system environments or configurations. Examples of well-known computing systems, environments, and/or configurations that may be suitable for use with the disclosure include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc., that perform tasks or implement abstract data types. The disclosure may also be practiced in distributed computing environments where tasks are performed by remote processing devices that are linked through a communications network. In a distributed computing environment, program modules may be in both local and remote computer storage media including memory storage devices.

The steps of methods and systems may be performed in orders beyond the order shown and/or described herein. Embodiments may omit steps shown and/or described in connection with illustrative methods. Embodiments may include steps that are neither shown nor described in connection with illustrative methods.

Illustrative methods and systems steps may be combined. For example, an illustrative method may include steps shown in connection with another illustrative method.

Methods and systems may omit features shown and/or described in connection with illustrative methods and systems. Embodiments may include features that are neither shown nor described in connection with the illustrative methods and systems. Features of illustrative methods and systems may be combined. For example, an illustrative embodiment may include features shown in connection with another illustrative embodiment.

The drawings show illustrative features of methods and systems in accordance with the principles of the disclosure. The features are illustrated in the context of selected embodiments. It will be understood that features shown in connection with one of the embodiments may be practiced in accordance with the principles of the disclosure along with features shown in connection with another of the embodiments.

One of ordinary skill in the art will appreciate that the steps shown and described herein may be performed in other ways and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, AI systems and methods for safeguarding output with respect to decisioning which queries qualify for an adaptive feedback loop are provided. Persons skilled in the art will appreciate that the present disclosure can be practiced in other ways. The described embodiments are presented for purposes of illustration—not limitation—and the present disclosure is limited only by the claims that follow.

What is claimed is:

1. An artificial intelligence ("AI") dynamic rule-based system for safeguarding output with respect to decisioning which queries qualify for an adaptive feedback loop, said decisioning operable with federated learning and auto-machine learning ("auto-ML"), the system comprising:

security risk assessment algorithm rules engine ("rules engine"), said rules engine comprising logic-based, language-encoded, rules ("rules") for weighting queries involving security risks and for flagging security risks comprising queries and outputs;

an internal compliance database, said internal compliance database comprising flagged queries, flagged outputs, and the rules;

an adaptive feedback loop mechanism;

a generative, pre-trained, transformer ("GPT") processor, said GPT processor operable to:

receive, by the GPT processor, a plurality of queries from a plurality of users;

forward, by the GPT processor, the plurality of queries to the rules engine for evaluation, the rules engine interfacing with the internal compliance database, said evaluation comparing the plurality of queries to the flagged queries in the internal compliance database and analyzing the plurality of queries based on the rules;

determine, by the GPT processor interfacing with the rules engine and the internal compliance database, a security risk level for each query in the plurality of queries;

generate, by the GPT processor, output for the plurality of queries with security risk levels above a first predetermined threshold;

deny, by the GPT processor, generating output for a plurality of queries with security risk levels below a second predetermined threshold;

send, by the rules engine, a plurality of queries with security risk levels lower than the first predetermined threshold and higher than the second predetermined threshold to the adaptive feedback loop mechanism; and for each query sent to the adaptive feedback loop mechanism, the adaptive feedback loop mechanism is operable to:

generate, by the GPT processor, output corresponding to a plurality of queries with security risk levels lower than the first predetermined threshold and higher than the second predetermined threshold ("mid-output");

secure the mid-output by:

analyzing the mid-output by the rules;

comparing the mid-output to the flagged outputs;

modifying the mid-output based on the analyzing and the comparing; and refining the rules, using federated learning and auto-ML, based on the analyzing, the comparing, and the modifying by:

identifying one or more rules, included in the rules engine, that caused the security risk level to be below the first predetermined threshold; and adjusting a weighting of the identified one or more rules at the rules engine.

2. The system of claim 1, wherein the adjusting a weighting of the identified one or more rules at the rules engine comprises lowering the weighting.

3. The system of claim 1, wherein the adjusting a weighting of the identified one or more rules at the rules engine comprises raising the weighting.

4. The system of claim 1, wherein the mid-output is checked and modified before the mid-output reaches a user.

5. The system of claim 1, wherein the mid-output is provided to the plurality of users with approximately no lag time.

6. The system of claim 1, wherein the plurality of queries comprises hate speech, false information, and inappropriate language.

7. The system of claim 1, wherein the refining of the rules uses reinforcement learning ("RL"), based on the analyzing, the comparing, and the modifying.

8. The system of claim 1, wherein the refining of the rules uses neural networks, based on the analyzing, the comparing, and the modifying.

9. The system of claim 1, wherein the refining the rules uses edge computing for increasing scalability of the rules engine.

10. The system of claim 1, wherein the refining the rules uses distributive processing for enhancing scalability of the rules engine.

11. An artificial intelligence ("AI") dynamic rule-based method for safeguarding output with respect to decisioning which queries qualify for an adaptive feedback loop, said decisioning operable with federated learning and auto-machine learning ("auto-ML"), the method comprising: receiving, by a generative, pre-trained, transformer ("GPT") processor, a plurality of queries from a plurality of users; forwarding, by the GPT processor, the plurality of queries to a security risk assessment algorithm rules engine ("rules engine") for evaluation, the rules engine interfacing with an internal compliance database, said evaluation comparing the plurality of queries to flagged queries in the internal compliance database and analyzing the plurality of queries based on logic-based, language-encoded, rules ("rules") for weighting queries involving security risks and for flagging security risks comprising queries and outputs; determining, by the GPT processor interfacing with the rules engine and the internal compliance database, a security risk level for each query in the plurality of queries; generating, by the GPT processor, output for the plurality of queries with security risk levels above a first predetermined threshold; denying, by the GPT processor, generating output for a plurality of queries with security risk levels below a second predetermined threshold; sending, by the rules engine, a plurality of queries with security risk levels lower than the first predetermined threshold and higher than the second predetermined threshold to an adaptive feedback loop mechanism; and for each query sent to the adaptive feedback loop mechanism, the adaptive feedback loop mechanism:

generating, by the GPT processor, output corresponding to a plurality of queries with security risk levels lower than the first predetermined threshold and higher than the second predetermined threshold ("mid-output"); securing the mid-output by: analyzing the mid-output by the rules; comparing the mid-output to flagged outputs; modifying the mid-output based on the analyzing of the mid-output by the rules and the comparing of the mid-output to flagged outputs; and refining the rules, using federated learning and auto-ML, based on the analyzing, the comparing, and the modifying by: identifying one or more rules, included in the rules engine, that caused the security risk level to be below the first predetermined threshold; and adjusting a weighting of the identified one or more rules at the rules engine.

12. The method of claim 11, wherein the adjusting a weighting of the identified one or more rules at the rules engine comprises lowering the weighting.

13. The method of claim 11, wherein the adjusting a weighting of the identified one or more rules at the rules engine comprises raising the weighting.

14. The method of claim 11, wherein the mid-output is checked and modified before the mid-output reaches a user.

15. The method of claim 11, wherein the mid-output is provided to the plurality of users with approximately no lag time.

16. The method of claim 11, wherein the plurality of queries comprises hate speech, false information, and inappropriate language.

17. The method of claim 11, wherein the refining of the rules uses reinforcement learning ("RL"), based on the analyzing, the comparing, and the modifying.

18. The method of claim 11, wherein the refining of the rules uses neural networks, based on the analyzing, the comparing, and the modifying.

19. The method of claim 11, wherein the refining of the rules uses edge computing for increasing scalability of the rules engine.

20. The method of claim 11, wherein the refining of the rules uses distributive processing for enhancing scalability of the rules engine.

* * * * *